C. I. DICKERSON.
AIR CUSHIONED WHEEL.
APPLICATION FILED SEPT. 21, 1915.
1,169,936.
Patented Feb. 1, 1916.
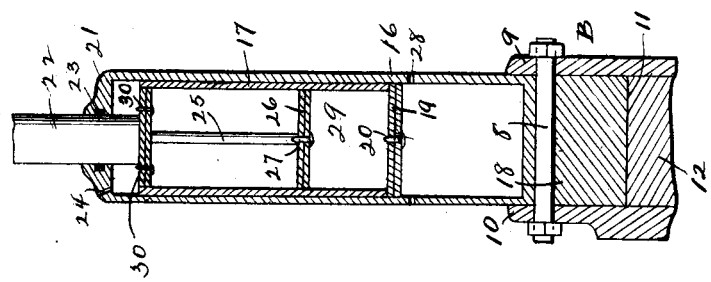
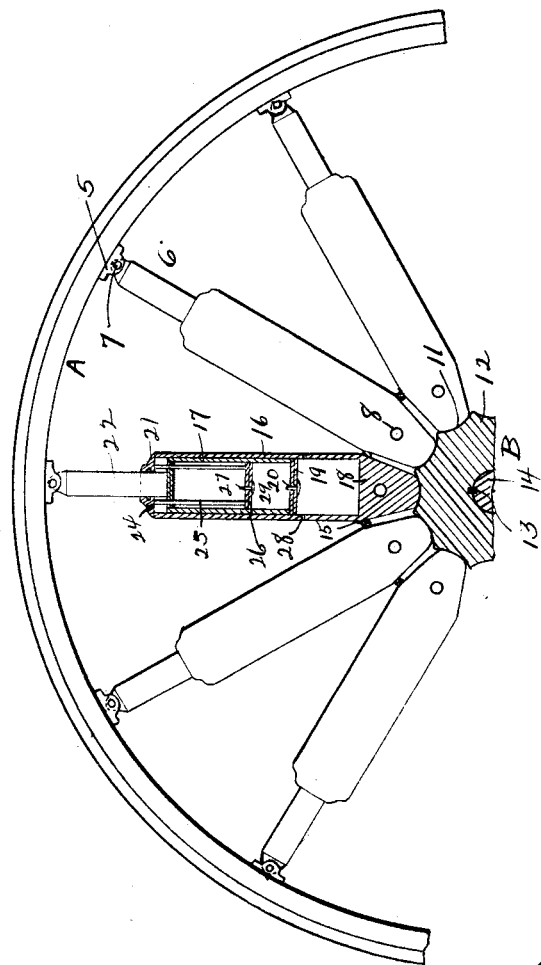
Inventor
Charles I. Dickerson
By Richard Peale Herrick
Attorney

UNITED STATES PATENT OFFICE.

CHARLES I. DICKERSON, OF DUCHESNE, UTAH.

AIR-CUSHIONED WHEEL.

1,169,936.  Specification of Letters Patent.  Patented Feb. 1, 1916.

Application filed September 21, 1915. Serial No. 51,780.

*To all whom it may concern:*

Be it known that I, CHARLES I. DICKERSON, a citizen of the United States of America, residing at Duchesne, in the county of Duchesne and State of Utah, have invented certain new and useful Improvements in Air-Cushioned Wheels, of which the following is a specification.

This invention relates to air cushioned vehicle wheels and it has for its object the provision of an improved device of this character constructed in such manner that it will present a yielding surface to the road bed while at the same time it will be impervious to puncture.

A further object of the invention is the provision of a cushioned vehicle wheel constructed in such manner that the movement of the rim in a vertical plane, with relation to the axle will result in compressing air within the spoke of the wheel.

Further objects and advantages of the invention will be set forth in the detailed description which now follows:

In the accompanying drawings:—Figure 1 is a side elevation of a portion of a vehicle wheel with certain of the parts in section; and Fig. 2 is a detailed sectional view of one of the spokes of said wheel.

Like numerals designate corresponding parts in both of the figures of the drawings.

In the drawings, A designates the rim of the wheel and B the hub portion thereof. The rim has secured thereto a plurality of lugs 5 to which the outer ends of the spokes 6 are pivotally connected by means of pivot bolts 7. The inner ends of the spokes are pivotally connected to the hub section B by means of pivot bolts 8 which pass transversely through the inner ends of the spokes and through inner and outer side plates 9 and 10 as best illustrated in Fig. 2. The inner ends of the spokes are rounded as at 11 and have a snug seating in the hub core 12, the latter being keyed at 13 to the axle, 14 but being otherwise floatingly mounted between the inner and outer hub plates 9 and 10. To prevent the entry of dust, mud or water to the interior of the hub, packing strips 15 are disposed transversely of the hub section at the point where the spokes contact with each other.

Each of the spokes comprises a hub carried tubular section 16 and a rim carried section 17. The bottom of the tubular section 16 is closed by head 18 and the section 17 constitutes a plunger disposed and operating in the tubular section 16. This plunger comprises a piston 19 carrying an inwardly opening check valve 20. The outer end of the tubular section 16 is provided with a head 21 through which plungers 22 by which tubular sections 17 are carried, slide. These heads carry suitable packing indicated at 23 and are perforated at 24. Rods 25 projecting radially inward from the heads carry pistons 26 having inwardly opening check valves 27 therein. Small openings 28 are formed in the side walls of the tubular sections 16, the area of these openings being such and their location being such that the amount of air trapped within the inner tubular section 16 when the wheel is traveling over an ordinarily rough road is sufficient to properly cushion the part, but where the vehicle is traveling over an abnormally rough road, and the movement of the piston 19 into the tubular section 16 is an abnormal one, then the increased area of the chamber 29 between the pistons 26 and 19 creates a vacuum at that point and air enters said chamber through check valve 27. Air is supplied through check valves 30 (see Fig. 2) and ports 24. Then when the piston 19 moves outwardly with relation to the inner section 16, this air is forced into the interior of said inner tubular section by pistons 26 and placed under compression, thereby adapting the device to more efficiently cushion the vehicle in its travel over said abnormally rough roads.

It is a well known fact that a properly designed shock absorber for vehicles not only checks the downward movement of the vehicle body but also checks the rebound of the body. The present invention provides in a vehicle wheel a structure adapted also to carry out a function of this nature, for the reason that when the plunger 19 tends to move outwardly with relation to the inner tubular sections 16 it is partially checked by the presence of the air in the chamber 29. This air must be compressed to the pressure within the interior of the tubular sections 16 before it will enter said sections and in addition to that, it must be forced through the opening controlled by the check valve 20. Consequently there is a distinct checking action exercised by these parts which will act in the nature of a shock absorber as well as in cushioning the wheel.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:—

1. In a device of the character described, the combination with a hub member comprising a core having a plurality of concave recesses in its peripheral face, a plurality of spokes, each comprising a tubular section pivoted adjacent its inner end to said hub member and having a rounded inner end seated in one of said recesses, tubular sections, pistons carried by said tubular plungers and fitting in said tubular section, check valves carried by said pistons and opening inwardly, a rim member, rods passing through the outer ends of the tubular sections to which the tubular plungers are connected, said rods being pivoted at their outer ends to said rim member, pistons slidable in said tubular plungers, means for rigidly attaching said last named pistons to the tubular sections and inwardly opening check valves carried by said last named pistons.

2. In a device of the character described the combination with a hub and a rim of a plurality of spokes extending therebetween, each of said spokes comprising a tubular section pivoted at its inner end to the hub, a tubular plunger slidably disposed in said tubular section, a piston carried thereby, a member extending from said plunger to the rim, means for pivotally connecting said member to the rim, a piston mounted in said tubular plunger, means for rigidly supporting said piston with relation to the tubular section, and check valves carried by both of said pistons and opening toward the hub.

In testimony whereof I affix my signature in the presence of two witnesses.

CHARLES I. DICKERSON.

Witnesses:
 WILLIAM H. FITZWATER.
 LEVA FITZWATER.

Copies of this patent may be obtained for five cents each, by addressing the "Commissioner of Patents, Washington, D. C."